United States Patent
Yoon et al.

(10) Patent No.: US 9,071,488 B2
(45) Date of Patent: Jun. 30, 2015

(54) APPARATUS AND METHOD FOR TRANSMITTING A REFERENCE SIGNAL IN A WIRELESS COMMUNICATION SYSTEM

(75) Inventors: Sungjun Yoon, Seoul (KR); Kitae Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/580,779

(22) PCT Filed: Feb. 23, 2011

(86) PCT No.: PCT/KR2011/001263
§ 371 (c)(1),
(2), (4) Date: Aug. 23, 2012

(87) PCT Pub. No.: WO2011/105807
PCT Pub. Date: Sep. 1, 2011

(65) Prior Publication Data
US 2012/0314743 A1    Dec. 13, 2012

(30) Foreign Application Priority Data
Feb. 23, 2010 (KR) .................. 10-2010-0016195

(51) Int. Cl.
*H04K 1/10* (2006.01)
*H04L 27/26* (2006.01)
*H04L 25/02* (2006.01)
*H04B 7/02* (2006.01)

(52) U.S. Cl.
CPC ......... *H04L 27/2607* (2013.01); *H04L 25/0224* (2013.01); *H04L 27/2613* (2013.01); *H04B 7/024* (2013.01)

(58) Field of Classification Search
None
See application file for complete search history.

(56) References Cited

U.S. PATENT DOCUMENTS 8,094,638 B2 * 1/2012 Muharemovic et al. ...... 370/342

OTHER PUBLICATIONS

International Search Report of PCT/KR2011/001263 dated Oct. 25, 2011.
Potevio, "Proposal for an Enhanced SRS Scheme for CoMP," 3GPP TSG RAN WG1 #59bis, R1-100616, Jan. 18-22, 2010, Valencia, Spain.
Pantech, "Consideration on Uplink DM-RS sequence in LTE-Advanced," 3GPP TSG RAN WG1 #59bis, R1-100668, Jan. 18-22, 2010, Valencia, Spain.
Texas Instruments, "Increasing Sounding Capacity for LTE-A," 3GPP TSG WG1 #59bis, R1-100745, Jan. 18-22, 2010, Valencia, Spain.
Pantech & Curitel, "Considerations for DM-RS sequence design", 3GPP TSG RAN WG1 #59, R1-095076, Nov. 9-13, 2009, Jeju, Korea.
"Technical Specification Group Radio Access Network; Evolved Universal Terrestrial Radio Access (E-UTRA); Physical Channels and Modulation", 3GPP TS 36.211 V9.0.0, Dec. 2009, Valbonne, France.

* cited by examiner

*Primary Examiner* — Adolf Dsouza
(74) *Attorney, Agent, or Firm* — H.C. Park & Associates, PLC

(57) ABSTRACT

The present specification relates to a method/apparatus for extending and transmitting a reference signal, and to a method and apparatus for transmitting a cyclic shift (hereinafter, referred to as CS) parameter. In generating the extended reference signal, the CS is determined as a function for both a basic CS parameter and an extended CS parameter.

9 Claims, 11 Drawing Sheets (2a)

(2b)

(2c)

APPARATUS AND METHOD FOR TRANSMITTING A REFERENCE SIGNAL IN A WIRELESS COMMUNICATION SYSTEM

CROSS-REFERENCE TO RELATED APPLICATIONS

This application is the national Stage Entry of International Application NO. PCT/KR2011/001263, filed on Feb. 23, 2011 and claims priority from and the benefit of Korean Patent Application No. 10-2010-0016195 filed on Feb. 23, 2010, all of which are hereby incorporated by reference for all purposes as if fully set forth herein.

BACKGROUND

1. Field

The present invention relates to a wireless communication system, and more particularly to an apparatus and a method for transmitting a reference signal in a wireless communication system.

2. Discussion of the Background

With the progress of communication systems, consumers such as companies and individuals have used a wide variety of wireless terminals.

In current mobile communication systems, as a high-speed and high-capacity communication system capable of transmitting and receiving various data such as images and wireless data beyond voice-oriented services, it is required to develop a technology capable of transmitting a large amount of data coming close to that of a wired communication network. In addition, an appropriate error detection scheme in which system performance can be improved by minimizing information loss and increasing system transmission efficiency, becomes an essential element.

Also, in several current communication systems, various reference signals are used to provide information on a communication environment and the like to a counterpart apparatus in uplink or downlink.

For example, in an LTE (Long Term Evolution) system which is one of several mobile communication methods, during uplink transmission, a user equipment (UE) transmits a sounding reference signal corresponding to a channel estimation reference signal indicating a channel state of the UE to a base station apparatus. Also, during downlink transmission, in order to recognize channel information, the base station apparatus transmits a Cell-specific Reference Signal (CRS) corresponding to a reference signal to the UE in every subframe.

Meanwhile, it is usual that reference signals for this channel estimation and the like are periodically generated by an apparatus for transmitting a reference signal (for example, the UE in the case of an uplink reference signal, and the base station apparatus in the case of a downlink reference signal) and are then transmitted to an apparatus for receiving a reference signal.

Also, up to the present, such a channel estimation reference signal in uplink is generated in such a manner as to generate multiple sequences by changing a phase of an input signal in a conjugated manner by using a predetermined cyclic shift.

However, recently, due to the flexibility and the like of a communication system, there is a rising demand which is intended to further extend a channel estimation reference signal or a channel estimation sequence and use the extended channel estimation reference signal or the extended channel estimation sequence.

SUMMARY

Therefore, an aspect of the present invention is intended to provide an apparatus and a method for transmitting a reference signal in a wireless communication system.

An aspect of the present invention is intended to provide an apparatus and a method for extending a reference signal sequence.

Also, another aspect of the present invention is intended to provide an apparatus and a method for extending a Cyclic Shift (CS) generating a reference signal.

Another aspect of the present invention is intended to provide an apparatus and a method for determining a CS by simultaneously using a basic CS parameter and an extended CS parameter.

In accordance with an aspect of the present invention, there is provided a method for extending and transmitting a reference signal generated by using a cyclic shift (CS). The method includes: receiving a basic CS parameter and an extended CS parameter; determining an extended CS based on a function of the received basic CS parameter and the received extended CS parameter; generating a reference signal by using the determined extended CS; and transmitting the generated reference signal.

In accordance with another aspect of the present invention, there is provided a method for transmitting a cyclic shift (CS) parameter for extending a reference signal generated by using a CS. The method includes: determining a basic CS parameter and an extended CS parameter based on the number of reference signals requiring support; and transmitting the determined basic CS parameter and the determined extended CS parameter.

In accordance with another aspect of the present invention, there is provided an apparatus for extending and transmitting a reference signal generated by using a cyclic shift (CS). The apparatus includes: a transmitter/receiver for receiving a basic CS parameter and an extended CS parameter, and transmitting a generated reference signal; an extended CS determiner for determining an extended CS based on the received basic CS parameter and the received extended CS parameter; and a reference signal generator for generating a reference signal by using the determined extended CS.

In accordance with another aspect of the present invention, there is provided an apparatus for transmitting a cyclic shift (CS) parameter for extending a reference signal generated by using a CS. The apparatus includes: a CS parameter setter for setting a basic CS parameter and an extended CS parameter based on the number of reference signals requiring support; and a transmitter for transmitting the set basic CS parameter and the set extended CS parameter.

DETAILED DESCRIPTION OF THE ILLUSTRATED EMBODIMENT

Figure 1:
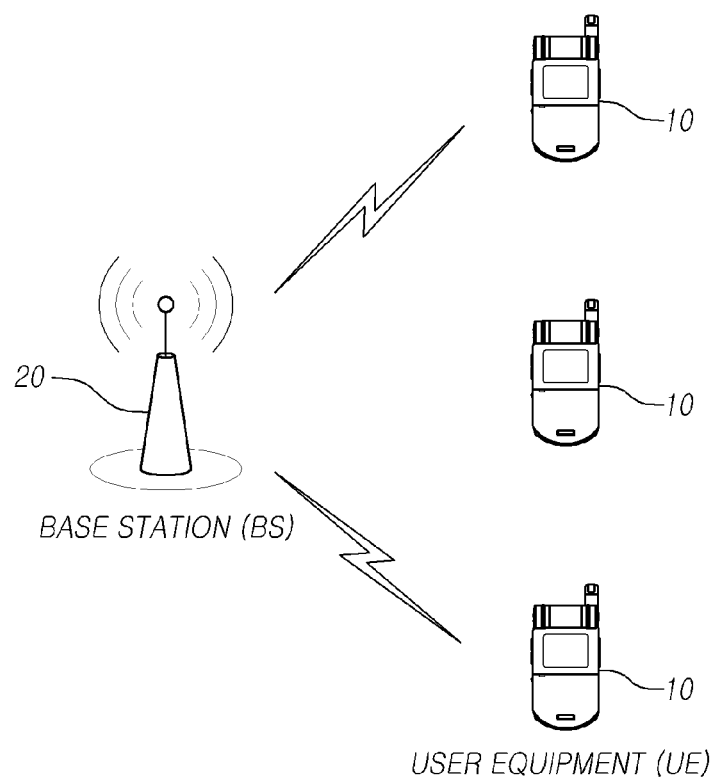
FIG. 1 is a view schematically showing a wireless communication system, to which an embodiment of the present invention is applied.

Hereinafter, exemplary embodiments of the present invention will be described in detail with reference to the accompanying drawings. It should be noted that in assigning reference numerals to elements in the drawings, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be understood that if it is described in the specification that one component is "connected," "coupled" or "joined" to another component, a third component may be "connected," "coupled," and "joined" between the first and second components, although the first component may be directly connected, coupled or joined to the second component.

FIG. 1 is a view illustrating a wireless communication system, to which exemplary embodiments of the present invention are applied.

The wireless communication system is widely arranged in order to provide various communication services, such as voice, packet data, etc.

Referring to FIG. 1, the wireless communication system includes a User Equipment (UE) 10 and a Base Station (BS) 20. A technology for generating an extended reference signal, such as each of exemplary embodiments which will be described below, is applied to the UE 10 and the BS 20. The technology for generating an extended reference signal will be described in detail with reference to FIG. 3 and the accompanying drawings following FIG. 3.

In this specification, the User Equipment (UE) 10 has a comprehensive concept implying a user terminal in wireless communication. Accordingly, the UEs should be interpreted as having the concept of including a MS (Mobile Station), a UT (User Terminal), an SS (Subscriber Station), a wireless device, and the like in GSM (Global System for Mobile Communications) as well as UEs (User Equipments) in WCDMA (Wideband Code Division Multiple Access), LTE (Long Term Evolution), HSPA (High Speed Packet Access), etc.

The BS 20 or a cell may usually refer to all apparatuses or all functions or a particular area, which communicate(s) with the UE 10, and may be called different terms, such as a Node-B, an eNB (evolved Node-B), a sector, a site, a BTS (Base Transceiver System), an AP (Access Point), and a relay node.

In this specification, the BS 20 or the cell should be interpreted as having a comprehensive meaning indicating a partial area or a function covered by a BSC (Base Station Controller) in CDMA (Code Division Multiple Access) or by a Node-B in WCDMA (Wideband Code Division Multiple Access), or by an eNB (or site) or a sector in LTE. Accordingly, the BS 20 or the cell has a meaning including various coverage areas, such as a mega cell, a macro cell, a micro cell, a pico cell, a femto cell, and a relay node communication range.

In this specification, the user equipment 10 and the base station 20, which are two transmission and reception subjects used to implement the art or the technical idea described in this specification, are used as a comprehensive meaning, and are not limited by a particularly designated term or word.

There is no limit to multiple access schemes applied to the wireless communication system. For example, use may be made of various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA.

In this respect, use may be made of a TDD (Time Division Duplex) scheme in which uplink transmission and downlink transmission are performed at different times. Otherwise, use may be made of an FDD (Frequency Division Duplex) scheme in which uplink transmission and downlink transmission are performed by using different frequencies.

The present invention should not be interpreted as being limited to or restricted by a particular wireless communication field, and should be interpreted as including all technical fields to which the spirit of the present invention can be applied.

The wireless communication system, to which an exemplary embodiment of the present invention is applied, may support an uplink and/or downlink HARQ (Hybrid Automatic Repeat reQuest), and may use a CQI (Channel Quality Indicator) for link adaptation. Also, multiple access schemes for downlink transmission and uplink transmission may be different from each other. For example, OFDMA (Orthogonal Frequency Division Multiple Access) may be used for downlink transmission, and SC-FDMA (Single Carrier-Frequency Division Multiple Access) may be used for uplink transmission.

Layers of a radio interface protocol between a UE and a network may be divided into a first layer (L1), a second layer (L2), and a third layer (L3) based on three lower layers of an Open Systems Interconnection (OSI) model, which is widely known in a communication system. A physical layer belonging to the first layer provides an information transmission service using a physical channel.

Figure 2:
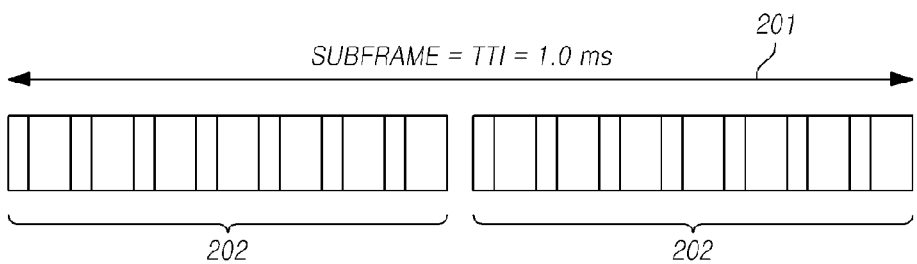
FIGS. 2A, 2B and 2C are views showing a structure of a typical subframe and a structure of a typical time slot for data transmission, which may be applied to an exemplary embodiment of the present invention.
Figure 2:
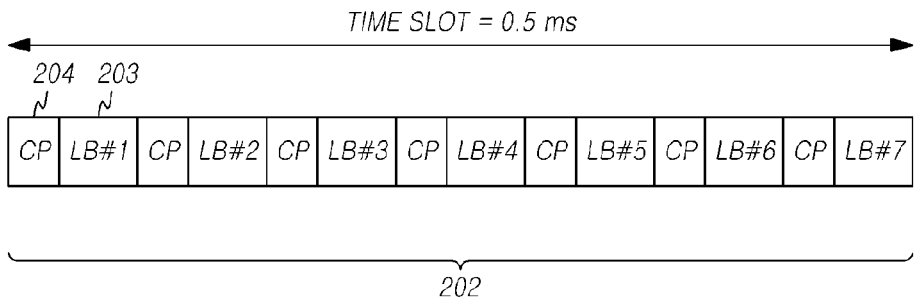
Figure 2:
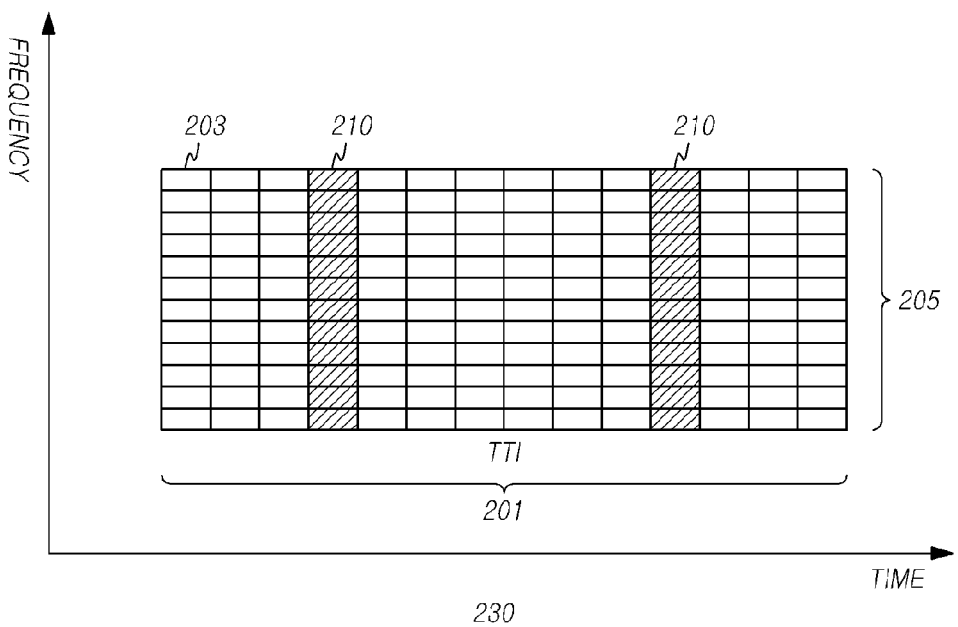

FIGS. 2A, 2B and 2C are views showing a structure of a subframe and a structure of a time slot for data transmission, which may be applied to an exemplary embodiment of the present invention.

Referring to FIG. 2A, one radio frame or one wireless frame may include 10 subframes, and one subframe may include 2 slots. The subframe is a basic unit of data transmission, and downlink or uplink scheduling is performed on a per-subframe basis. One slot may include multiple OFDM symbols in the time domain, and may include at least one subcarrier in the frequency domain. One slot may include 7 or 6 OFDM symbols.

For example, when one subframe includes two time slots, each time slot may include 7 or 6 symbols in the time domain, and may include 12 subcarriers in the frequency domain. In this regard, a time-frequency domain defined by a region corresponding to one slot along the time axis and 12 subcarriers along the frequency axis, as described above, may be called a Resource Block (RB). However, the present invention is not limited to this configuration.

In a 3GPP LTE system, the transmission time of a frame is divided into TTIs (Transmission Time Intervals), each having a duration of 1.0 ms. The terms "TTI" and "subframe" may be used in the same meaning. A frame has a length of 10 ms, and includes 10 TTIs.

FIG. 2B is a view showing a typical structure of a time slot according to an exemplary embodiment of the present invention. As described above, a TTI is a basic transmission unit. One TTI includes two equal length time slots 202, and each time slot has a duration of 0.5 ms. A time slot includes 7 or 6 Long Blocks (LBs) 203 for symbols. The LBs are separated by a Cyclic Prefix (CP) 204. Therefore, one TTI or one subframe may include 14 or 12 LB symbols. However, the present invention is not limited to the structure of a frame, or that of a subframe, or that of a time slot, as described above.

FIG. 2C is a view showing the configuration of one RB 230 during one subframe or TTI 201 according to an exemplary embodiment of the present invention. Each TTI or subframe is partitioned into 14 or 12 symbols (or symbol axes) 220 in the time domain. Each symbol (or symbol axis) may carry one symbol.

Also, the entire system bandwidth of 20 MHz is partitioned or divided into subcarriers 205 at different frequencies. In an example of FIG. 2C, a region which includes 12 consecutive subcarriers within one TTI and includes 14 or 12 symbols along the time axis and 12 subcarriers along the frequency axis, as described above, may be called a Resource Block (RB).

For example, a bandwidth of 10 MHz within one TTI may include 2 RBs in the time domain and 50 RBs in the frequency domain.

Lattice spaces which form such an RB may be called Resource Elements (REs).

Meanwhile, in an LTE communication system which is one of the current wireless communication schemes, in the case of uplink, a DeModulation Reference Signal (DMRS) and a Sounding Reference Signal (SRS) are defined. Also, in the case of downlink, reference signals, such as a Cell-specific Reference Signal (CRS), a Multicast/Broadcast over Single Frequency Network Reference Signal (MBSFN-RS), and a UE-specific reference signal, are defined.

Namely, in the wireless communication system, in order to deliver uplink channel information to a BS, a UE transmits a reference signal for uplink channel estimation, which is one type of reference signal, to the single BS.

An example of a reference signal may be a Sounding Reference Signal (SRS) used in LTE and LTE-Advanced. The SRS has a function equivalent to that of a pilot channel with respect to an uplink channel.

Hereinafter, in this specification, although a description focuses on an SRS corresponding to an example of a reference signal, the present invention should not be limited to the SRS, but should be understood as a concept including all types of uplink or downlink reference signals including multiple sequences, each of which has a phase changed by a Cyclic Shift (CS).

In the current LTE standard, an SRS sequence is generated by equation (1) below, the generated SRS sequence is subjected to resource mapping according to predetermined criteria, and is transmitted according to a subframe configuration as shown in Table 1 below.

$$r^{SRS}(n) = r_{u,v}^{(\alpha)}(n) = e^{j\alpha n} \bar{r}_{(u,v)}(n), \text{ and } 0 \le n \le M_{SC}^{RS} \quad (1)$$

In equation (1), $M_{sc}^{RS} = mN_{sc}^{RE}$ is the length of a reference signal sequence, $1 \le m \le N_{RE}^{maxUL}$, u is a sequence group number, and v is a base sequence number within the group. In equation (1), $N_{sc}^{RB}$ is the number of subcarriers per RB, and usually corresponds to 12 subcarriers. Also, $N_{RE}^{maxUL}$ corresponds to the maximum number of RBs which may be allocated during uplink (UL) transmission. Accordingly, $N_{sc}^{RS}$ represents the total number of subcarriers used to transmit a reference signal.

In equation (2) below, α in equation (1) is a Cyclic Shift (CS), $n_{SRS}^{CS}$ determining the CS has one value among integers from 0 to 7, and $n_{SRS}^{CS}$ is defined as a CS parameter in this specification.

$$\alpha = 2\pi \frac{n_{SRS}^{CS}}{8}, \quad (2)$$

and $$n_{SRS}^{CS} = 0, 1, 2, 3, 4, 5, 6, 7$$

In equation (2), $n_{SRS}^{CS}$ corresponding to a CS parameter has one value among integers from 0 to 7, and is set for each UE by an upper layer.

TABLE 1

| srsSubframeConfiguration | Binary | Configuration Period (subframes) | Transmission offset (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Inf | N/A |

Table 1 above which is a table for configuring a subframe of an FDD Sounding Reference Signal (SRS) defined in LTE, includes each format named "srsSubframeConfiguration"

defined by 4 bits, and prescribes a transmission cycle and an offset of an actual transmission subframe, in each case.

Namely, if the value of srsSubframeConfiguration is, for example, 8 (1000 in binary), it implies that the SRS is transmitted in second and third subframes, in every 5 subframes.

Figure 3:
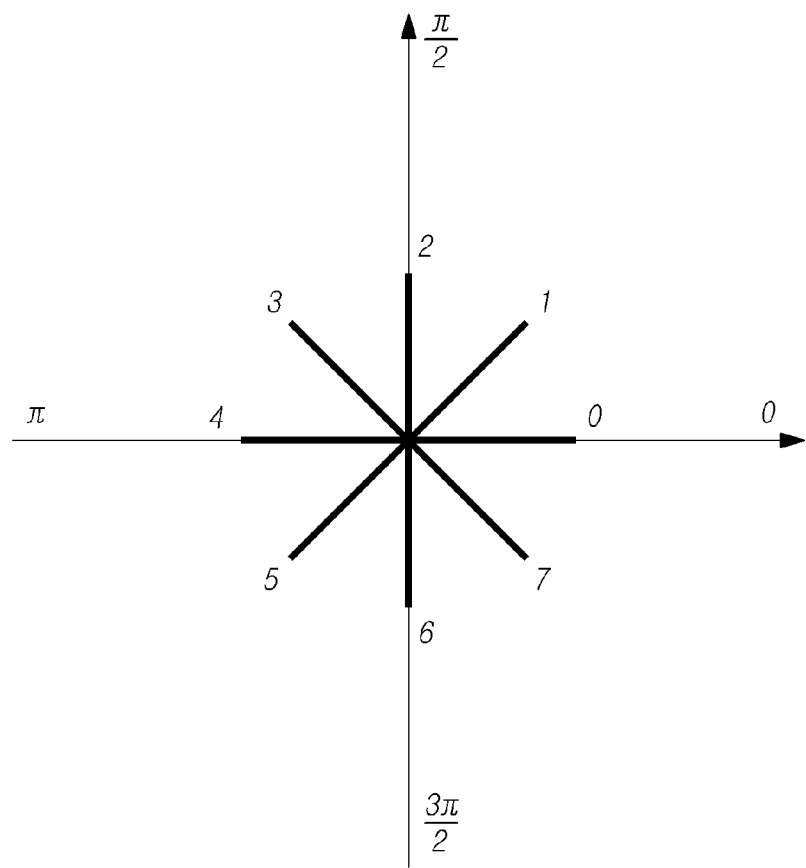
FIG. 3 is a view showing a phase distribution of a CS value used in an LTE communication system, to which the present invention is applied.

FIG. 3 is a view showing a phase distribution of a CS value used in an LTE communication system.

As shown in FIG. 3, a CS parameter $n_{SRS}^{CS}$ which has $\alpha = 2\pi n_{SRS}^{CS}/8$ corresponding to a CS value and determines a CS value, in an LTE system, has 8 values, such as 0, 1, 2, ..., and 7, and the CS value has 8 phase values, such as 0°, 45°, 90°, ..., and 315°, through the 8 values. In this case, a minimum phase difference between CS values exerting the greatest influence on the degree of orthogonality of two SRS sequences which have actually different CS values ($\alpha$s) and the degree of interference between them becomes 45°.

Meanwhile, as described above, the LTE which is one of the conventional communication schemes, only needs to support a single antenna in uplink. Accordingly, in this case, an SRS has been designed only for the single antenna. However, in a communication system, such as LTE-Advanced, which is currently being discussed, multi-antenna uplink transmission is being discussed, and the number of transmission antennas which perform uplink transmission is defined as a maximum of 4. Accordingly, a BS should recognize channel state information from all antennas of a UE in a particular frequency band.

In the current LTE, a total of 8 cyclic shifts and two SRS transmission comb (namely, two schemes each for arranging an SRS in a frequency space in such a manner as to discriminate an SRS from another SRS) are supported as defined by equations (1) and (2). Accordingly, SRS signals may be divided into a total of 16 SRS signal patterns, in an identical sounding frequency band.

However, when multiple transmission antennas are considered as in LTE-A, only the 16 SRS signal patterns defined in LTE are insufficient, and thus it is necessary to extend SRS signal patterns.

Namely, in communications technology, such as LTE, which is currently being discussed, a reference signal similar to a pilot used in an existing system is periodically transmitted, in order to obtain channel state information, information on various parameter values required for each channel for demodulation, positioning information, etc.

In the case of an SRS among reference signals, which is transmitted in uplink by a UE (i.e. terminal) for the purpose of acquiring sounding information according to the state of each channel of an eNB (i.e. base station), the number of Cyclic Shift (CS) parameters, each of which is associated with a phase transform of a reference signal sequence, is defined as "8," and each CS parameter is transmitted with 3 bits in length through scheduling of an upper side. By using the 8 CS parameters, an orthogonal discrimination is made between UEs corresponding to 8 persons, the 8 CS parameters are multiplexed, and the multiplexed 8 CS parameters are transmitted.

However, in LTE-A evolved from LTE, in the case of uplink, the number of antennas, through each of which an SRS is transmitted, increases up to a maximum of 4. When each UE (i.e. terminal) or each BS (i.e. cell) is considered in an environment, such as an increase in the number of antennas as described above and a new MU (Multi-User) MIMO (Multiple-Input Multiple-Output) or CoMP (Coordinated Multi-Point Tx/Rx), there is a rising need for increasing the number of orthogonal resources, between which an orthogonal discrimination should first be made and which should then be multiplexed.

Herein, MIMO signifies a communication scheme in which a maximum of 8×8 MIMO antennas are used on both a transmitter side and a receiver side. CoMP is an abbreviation for a Coordinated Multi-Point transmission/reception System, and signifies a system in which the UE 10 simultaneously receives information from one or more BSs 20 (i.e. one or more cells).

Such a CoMP system may include multiple BSs or cells, and may include one serving cell or one serving transmitter side and a remaining cooperative cell. A set of all cells or BSs which cooperatively communicate with one UE in a CoMP scheme may be expressed as a CoMP set. In order to smoothly transmit information, the UE should transmit information on a downlink channel to one or more BSs.

Also, when LTE-A prescribes a differently-defined SRS pattern, there is a restriction in that backward compatibility with the conventional LTE should be satisfied. Accordingly, it is not easy to extend SRS signal patterns.

Currently, two schemes are being discussed in relation to the extension of SRS signal patterns. Firstly, there is a scheme for extending CS parameters, and secondly, there is a scheme for increasing a Repetition Factor (RPF).

The scheme for extending CS parameters, as a first scheme will be described below.

The LTE currently provides 8 CS determination parameters, as defined by equation (2). In a next-generation communication system, $n_{SRS,extend}^{CS}$ corresponding to a separate extended CS parameter is defined and used, as defined by equation (3) below.

$$\alpha_{extend}(n_{SRS,extend}^{CS}) = 2\pi \frac{n_{SRS,extend}^{CS}}{N}, \quad (3)$$

and $$0 \leq n_{SRS,extend}^{CS} \leq (N-1)$$

For the backward compatibility with the existing LTE, an extended sounding channel generated by an extended CS parameter should be mutually orthogonal not only to another extended sounding channel, but also to a sounding channel in the existing LTE.

Also, in equation (3), there are restrictions in that 24/N should be an integer for N, and in that $n_{SRS,extend}^{CS}$ should satisfy that N should be determined in such a manner that $\alpha_{extend}(n_{SRS,extend}^{CS})$ is not included in $\{\alpha(0), \ldots, \alpha(7)\}$.

When these restrictive conditions are considered, N should become one of 6, 12 and 24, $n_{SRS,extend}^{CS}$ should be selected among an integer set $\{1, 2, 4, 5\}$ when N=6 $n_{SRS,extend}^{CS}$ should be selected among an integer set $\{1, 2, 4, 5, 7, 8, 10, 11\}$ when N=12, and $n_{SRS,extend}^{CS}$ should be selected among an integer set $\{1, 2, 4, 5, 7, 8, 10, 11, 13, 14, 16, 17, 19, 20, 22, 23\}$ when N=24.

Meanwhile, the second scheme for extending SRS signal patterns is the scheme for increasing an RPF. Currently, an RPF is 2 in LTE. When an RPF is increased to 4, the number of transmission combs becomes 4, and the 4 transmission combs may be allocated to a total of 4 antennas of a UE, respectively. Accordingly, sounding may be simultaneously performed through a total of 32 antennas.

However, in the second scheme, an RPF becomes different from an RPF value in the existing LTE, and thus the length of an SRS sequence is changed in an identical sounding frequency band. Accordingly, the backward compatibility with the existing LTE may not be maintained.

However, after $n_{SRS,extend}^{CS}$ corresponding to a separate extended CS parameter is separately defined as in equation (3) as well as $n_{SRS}^{CS}$ corresponding to a conventional CS parameter, $\alpha(n_{SRS}^{CS})$ corresponding to a basic CS and $\alpha(n_{SRS,extend}^{CS})$ corresponding to an extended CS should first be separately generated and should then be used. Accordingly, the process as described above is complicated, and there is a difficulty in dynamic compatibility with the existing LTE.

Namely, the scheme for extending a CS as defined by equation (3) does not include, at all, the contents of how a discrimination is to be made between 8 CSs ($\alpha$ values) according to the existing LTE and added CSs, which are newly defined and are then added, and how they are to be applied. Also, this scheme has a disadvantage in that a phase angle difference on the complex plane between the 8 CSs ($\alpha$ values) according to the existing LTE and the added CSs, which are newly defined and are then added, becomes very small up to at least 15 degrees ($=\pi/12$) and thus it is difficult to discriminate between them.

In other words, one proposed method among methods each for extending a CS, which are currently being discussed, is a method for increasing the number of CS values ($\alpha$s) from 8 to 12 or 16. When 12 or 16 CS values ($\alpha$s) are newly defined, backward compatibility with the 8 CS values ($\alpha$s) for the existing LTE may cause a problem. Also, when only newly-added 4 or 8 CS values are newly defined in the case of increasing the number of CS values from 8 to 12 or 16 for the backward compatibility with the 8 CS values ($\alpha$s) for the existing LTE, it is necessary to perform signaling for the existing CS values and signaling for the newly-added CS values in such a manner that a discrimination is made between the existing CS values and the newly-added CS values. In addition, there is a need for a design method capable of ensuring the orthogonality of two SRS sequences having different CS values and reducing interference between the two SRS sequences having different CS values, by basically causing a phase difference between newly-designed CS values to become as large as possible.

Accordingly, an exemplary embodiment of the present invention proposes a method and an apparatus for increasing the number of CS values ($\alpha$s) of an SRS from the existing 8 to 12 or 16 by adding 4 or 8 to the existing 8, in order to increase the number of orthogonal resources, between which an orthogonal discrimination should first be made and which should then be multiplexed, in view of each UE (i.e. terminal) or each BS (i.e. cell) in an environment, which includes an increase in the number of antennas in LTE-A, a new MU MIMO and CoMP, in the case of generating and transmitting a reference signal, such as an SRS, in uplink. Particularly, an exemplary embodiment provides a method capable of easily performing signaling for CS values ($\alpha$s) in the existing LTE and signaling for newly-added CS values ($\alpha$s) in such a manner that an easy discrimination is made between the CS values ($\alpha$s) in the existing LTE and the newly-added CS values ($\alpha$s), for backward compatibility with the existing LTE, while maintaining the backward compatibility. Also, an exemplary embodiment provides a design method capable of ensuring the orthogonality of two SRS sequences having different CS values and reducing interference between the two SRS sequences having different CS values, by basically causing a phase difference between existing CS values and newly-designed CS values to become as large as possible.

In this specification, for convenience of description, $n_{SRS}^{CS}$ corresponding to a CS parameter used to determine a CS in the existing LTE represents a basic CS parameter, and $n_{SRS,extend}^{CS}$ corresponding to a newly-defined extended CS parameter represents an extended CS parameter. However, the present invention is not limited to these terms. Also, it is obvious that the above parameters can be expressed by another formula which can express the meaning of another term or those of the parameters within the limits in which contents including the defined contents can be well expressed.

Accordingly, in an exemplary embodiment, in generating an extended reference signal, a cyclic shift is characterized by being determined as a function of both a basic CS parameter $n_{SRS}^{CS}$ and an extended CS parameter $n_{SRS,extend}^{CS}$.

Namely, in an exemplary embodiment, differently from a conventional scheme for first determining an existing CS only by a basic CS parameter and then generating a reference signal, $\alpha$ corresponding to a CS of a reference signal sequence is determined by a function, which simultaneously has an existing basic CS parameter $n_{SRS}^{CS}$ and an extended CS parameter $n_{SRS,extend}^{CS}$ as factors, as defined by equation (4) below.

In an exemplary embodiment, an extended CS parameter which is a signal having 1 bit or more, may be transmitted to an apparatus for transmitting a channel estimation reference signal (a UE in the case of an SRS) through upper layer signaling.

$$\alpha = f(n_{SRS}^{CS}, n_{SRS,extend}^{CS}) \quad (4)$$

Also, as a more specific scheme, extended CSs may be caused to be determined by equations (5) to (7) below.

$$\alpha(n_{SRS}^{CS}, n_{SRS,extend}^{CS}) = 2\pi \frac{(n_{SRS}^{CS} + n_{SRS,extend}^{CS}/2)}{8}, \quad (5)$$

and $$n_{SRS,extend}^{CS} \in \{0, 1\}$$

In an embodiment as expressed by equation (5), $n_{SRS}^{CS}$ corresponding to a basic CS parameter is determined in such a manner as to be signaled to one value among {0, 1, 2, 3, 4, 5, 6, 7}, which may still be expressed as 3 bits. In equation (5), $n_{SRS,extend}^{CS}$ corresponding to an extended CS parameter is determined in such a manner as to be signaled to one value among {0, 1}, which may be expressed as 1 bit. When the extended CS parameter is "0," the backward compatibility with LTE is satisfied under an identical condition to that of the existing LTE. When the extended CS parameter is 1, a total of 8 extended CSs, such as $\pi/8$, $\pi/4+\pi/8$, $2\pi/4+\pi/8$, $3\pi/4+\pi/8$, $\pi+\pi/8$, $5\pi/4+\pi/8$, $6\pi/4+\pi/8$, and $7\pi/4+\pi/8$, are further generated. Accordingly, a total of 16 CSs, including 8 basic CSs, are generated.

The extended CS parameter $n_{SRS,extend}^{CS}$ as described above may be transmitted to an apparatus for generating a channel estimation reference signal (a UE in the case of an SRS) through upper layer signaling, for example, RRC (Radio Resource Control) signaling. However, the present invention is not limited to this configuration.

Figure 4:
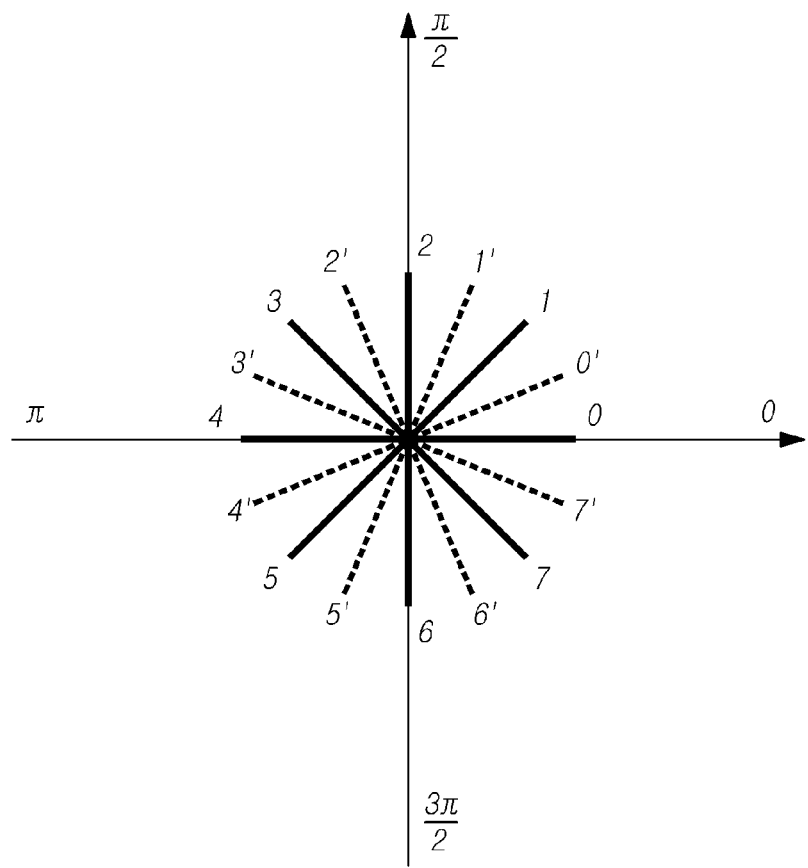
FIG. 4 is a view showing a phase distribution of an extended CS value ($\alpha$) generated according to an embodiment of the present invention.

When CSs generated by an embodiment as expressed by equation (5) are drawn on the complex plane, a view as shown in FIG. 4 is obtained.

Namely, when the extended CS parameter $n_{SRS,extend}^{CS}$ is "0," 0 to 7 which represent a total of 8 CSs spaced at 45 degrees from each other as shown in solid lines, are generated. When the extended CS parameter $n_{SRS,extend}^{CS}$ is 1, 0' to 7' representing a total of 8 extended CSs, which are uniformly arranged between adjacent basic CSs, are additionally generated. As a result, according to an embodiment as expressed by equation (5), a total of 16 CSs spaced at 22.5 degrees from each other may be generated.

In this case, CS values all have 22.5 degrees as a minimum phase difference therebetween, which exerts the greatest influence on the degree of orthogonality of two SRS sequences actually having different CS values ($\alpha$s) and the degree of interference between the two SRS sequences.

Accordingly, when it is considered that a minimum phase difference between CS values becomes 15 degrees in the case of newly defining 12 CS values for LTE-A separately from 8 CS values in the existing LTE, the orthogonality of adjacent SRSs may be further ensured, as well.

Figure 5:
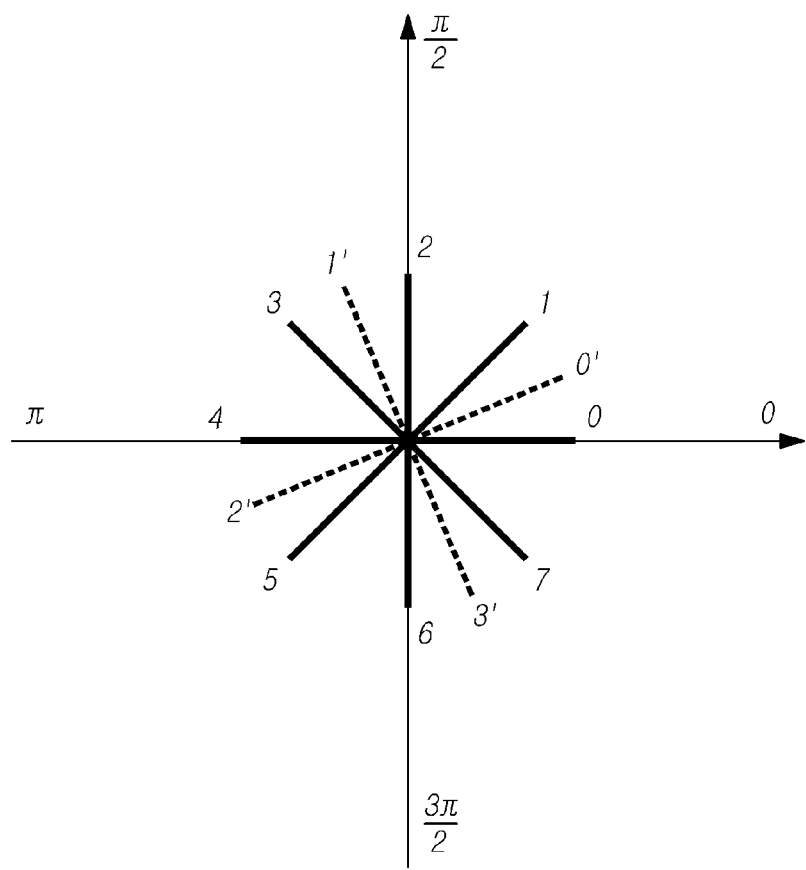
FIG. 5 is a view showing a phase distribution of an extended CS value (α) generated according to another embodiment of the present invention.

In another embodiment, an extended CS may be generated as defined by equation (6) below and as shown in FIG. 5.

$$\alpha(n_{SRS}^{CS}, n_{SRS,extend}^{CS}) = 2\pi \frac{(n_{SRS}^{CS} \cdot (n_{SRS,extend}^{CS} + 1) + n_{SRS,extend}^{CS}/2)}{8}, \quad (6)$$

and $$n_{SRS,extend}^{CS} \in \{0, 1\}$$

In an embodiment as expressed by equation (6), $n_{SRS}^{CS}$ corresponding to a basic CS parameter is determined in such a manner as to be signaled to one value among $\{0, 1, 2, 3, 4, 5, 6, 7\}$ which may still be expressed as 3 bits in the same manner as in the case of CS parameters in the existing LTE.

In equation (6), $n_{SRS,extend}^{CS}$ corresponding to an extended CS parameter is determined in such a manner as to be signaled to one value among $\{0, 1\}$, which may be expressed as 1 bit. When an extended CS parameter is "0," the backward compatibility with LTE is satisfied under an identical condition to that of the existing LTE. When the extended CS parameter is 1, a total of 4 extended CSs, such as $\pi/8$, $2\pi/4+\pi/8$, $\pi+\pi/8$, and $6\pi/4+\pi/8$ are further generated. Accordingly, a total of 12 CSs, including 8 basic CSs, are generated.

The extended CS parameter $n_{SRS,extend}^{CS}$ as described above may be transmitted to an apparatus for generating a reference signal (a UE in the case of an SRS) through upper layer signaling, for example, RRC (Radio Resource Control) signaling. However, the present invention is not limited to this configuration.

When CSs generated by an embodiment as expressed by equation (6) are drawn on the complex plane, a view as shown in FIG. 5 is obtained.

Namely, when the extended CS parameter $n_{SRS,extend}^{CS}$ is "0," 0 to 7 which represent a total of 8 CSs spaced at 45 degrees from each other as shown in solid lines, are generated. When the extended CS parameter $n_{SRS,extend}^{CS}$ is 1, 0' to 3' representing a total of 4 extended CSs, which are arranged in quadrants, respectively, and are arranged between adjacent basic CSs, are additionally generated. As a result, according to an embodiment as expressed by equation (6), a total of 12 CSs which are spaced at 45 degrees from each other or are spaced at 22.5 degrees from each other, may be generated.

In this case, CS values all have 22.5 degrees as a minimum phase difference therebetween, which exerts the greatest influence on the degree of orthogonality of two SRS sequences actually having different CS values ($\alpha$s) and the degree of interference between the two SRS sequences.

Accordingly, when it is considered that a minimum phase difference between CS values becomes 15 degrees in the case of newly defining 12 CS values for LTE-A separately from 8 CS values in the existing LTE, the orthogonality of adjacent SRSs may be further ensured, as well.

Figure 6:
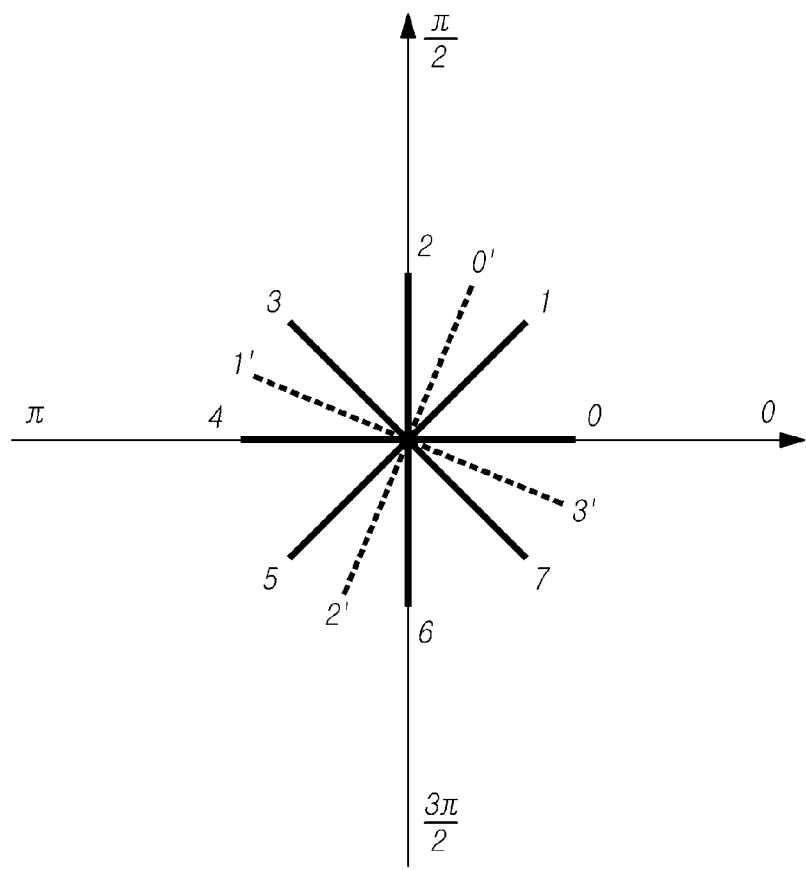
FIG. 6 is a view showing a phase distribution of an extended CS value (α) generated according to still another embodiment of the present invention.

In still another embodiment, which is matched with another embodiment as defined by equation (6) and as shown in FIG. 5, an extended CS may be generated as defined by equation (7) below and as shown in FIG. 6.

$$\alpha(n_{SRS}^{CS}, n_{SRS,extend}^{CS}) = 2\pi \frac{(n_{SRS}^{CS} \cdot (n_{SRS,extend}^{CS} + 1) + 3n_{SRS,extend}^{CS}/2)}{8}, \quad (7)$$

and $$n_{SRS,extend}^{CS} \in \{0, 1\}$$

In an embodiment as expressed by equation (7), $n_{SRS}^{CS}$ corresponding to a basic CS parameter is determined in such a manner as to be signaled to one value among $\{0, 1, 2, 3, 4, 5, 6, 7\}$ which may still be expressed as 3 bits in the same manner as in the case of CS parameters in the existing LTE.

In equation (7), $n_{SRS,extend}^{CS}$ corresponding to an extended CS parameter is determined in such a manner as to be signaled to one value among $\{0, 1\}$, which may be expressed as 1 bit. When an extended CS parameter is "0," the backward compatibility with LTE is satisfied under an identical condition to that of the existing LTE. When the extended CS parameter is 1, a total of 4 extended CSs, such as $3\pi/8$, $2\pi/4+3\pi/8$, $\pi+3\pi/8$ and $6\pi/4+3\pi/8$ are further generated. Accordingly, a total of 12 CSs, including 8 basic CSs, are generated.

When CSs generated by an embodiment as expressed by equation (7) are drawn on the complex plane, a view as shown in FIG. 6 is obtained.

Namely, when the extended CS parameter $n_{SRS,extend}^{CS}$ is "0," 0 to 7 which represent a total of 8 CSs spaced at 45 degrees from each other as shown in solid lines, are generated. When the extended CS parameter $n_{SRS,extend}^{CS}$ is 1, 0' to 3' representing a total of 4 extended CSs, which are arranged in quadrants, respectively, and are arranged between adjacent basic CSs, are additionally generated. As a result, according to an embodiment as expressed by equation (7), a total of 12 CSs which are spaced at 45 degrees from each other or are spaced at 22.5 degrees from each other, may be generated.

An embodiment as expressed by equation (6) and an embodiment as expressed by equation (7) are only different in that an additionally generated extended CS is shifted by 90 degrees, and are similar in the entire configuration.

As described above, in an embodiment as expressed by equation (6) and in an embodiment as expressed by equation (7), a phase angle difference between adjacent CSs becomes 22.5 degrees or more. Accordingly, these embodiments have an effect such that the phase angle difference between adjacent CSs may be greater than a minimum value of a phase angle according to the scheme as expressed by equation (3).

Figure 7:
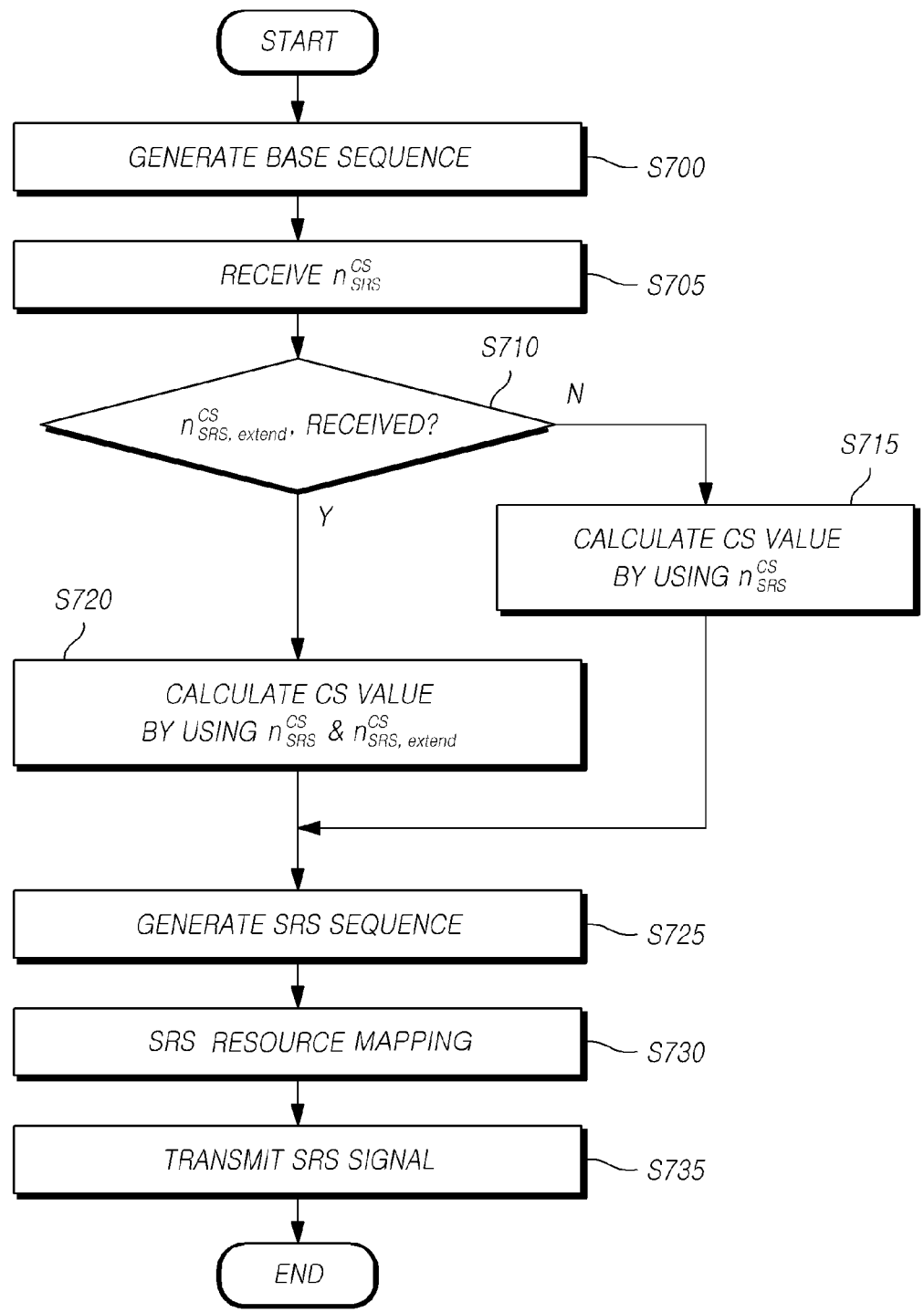
FIG. 7 is a flowchart showing the entire flow of a method for extending and transmitting a reference signal according to an embodiment of the present invention.

FIG. 7 is a flowchart showing the entire flow of a method for extending and transmitting a reference signal, which adopts a method for generating an extended CS according to an embodiment of the present invention.

A method for extending and transmitting a reference signal according to an embodiment of the present invention, which is a method for extending and transmitting a reference signal generated by using a CS, may include: receiving a basic CS parameter $n_{SRS}^{CS}$ and an extended CS parameter $n_{SRS,extend}^{CS}$; determining an extended CS based on a function of both the received basic CS parameter and the received extended CS parameter; generating a reference signal by using the determined extended CS; and transmitting the generated reference signal.

A method for transmitting a reference signal according to an embodiment of the present invention may be performed by a UE, when a reference signal is an SRS.

A more specific configuration of a method for extending and transmitting a reference signal according to an embodiment of the present invention will be described below with reference to FIG. 7 and FIG. 8.

First, a UE generates a base sequence (S700), and receives $n_{SRS}^{CS}$ corresponding to a basic CS parameter or a cyclic delay value from an upper layer (S705).

Although a base sequence $\bar{r}_{u,v}(n)$ may be generated based on a Zadoff-Chu sequence, the present invention is not limited to this example. Also, the length of the base sequence is equal to the total number of subcarriers allocated for transmitting an SRS on one symbol axis. Namely, when the length of the base sequence is represented as $M_{sc}^{RS}$, $0 \leq n < M_{sc}^{RS}$.

Then, the UE identifies whether $n_{SRS,extend}^{CS}$ corresponding to an extended CS parameter is received from the upper layer (S710). Next, when the extended CS parameter has not been received, the UE calculates a CS by using only a basic CS parameter as in the existing LTE (S715).

In step S710, when the extended CS parameter has been received, the UE calculates a CS value by using $n_{SRS}^{CS}$ corresponding to the basic CS parameter and $n_{SRS,extend}^{CS}$ corresponding to the extended CS parameter (S720). At this time, when the received extended CS parameter has a value of "0," the UE calculates, as an extended CS, one of 8 CS values identical to those in the existing LTE. In contrast, when the received extended CS parameter has a value of 1, the UE calculates, as an extended CS, one of newly-added 4 or 8 CS values.

At this time, the basic CS parameter may be $n_{SRS}^{CS} \in \{0, \ldots, 7\}$ corresponding to a basic CS parameter according to LTE, and the extended CS parameter may be $n_{SRS,extend}^{CS} \in \{0, 1\}$ corresponding to an extended CS parameter newly defined for LTE-A. In this case, $\alpha(n_{SRS}^{CS}, n_{SRS,extend}^{CS})$ corresponding to an extended CS may be determined based on one of the functions as expressed above by equations (5) to (7).

At this time, the extended CS value calculated in step S720 is calculated from the two parameters $n_{SRS}^{CS}$ and $n_{SRS,extend}^{CS}$ differently from the existing LTE. The basic CS parameter $n_{SRS}^{CS}$ is a 3-bit value which is determined by the upper side of the system as in the existing LTE, and may have a total of 8 values, such as 0 to 7, each of which is a value obtained by expressing this 3-bit value in a decimal form. When there is a need for an additional extended CS value other than 8 CS values according to the existing LTE Rel-8, the extended CS parameter $n_{SRS,extend}^{CS}$ has a value of 1. Otherwise, the extended CS parameter $n_{SRS,extend}^{CS}$ has a value of "0." At this time, additional 4 or 8 values may be defined as additional CSs, as well as 8 CS values identical to those in the existing LTE. One of these 12 or 16 values may be determined for each UE as in the existing LTE, by the upper side of the system. Otherwise, as the need arises, one of these 12 or 16 values may be determined for each antenna or BS (cell).

When α corresponding to an extended CS is calculated in step S720, an SRS sequence is finally generated by multiplying $\bar{r}_{u,v}(n)$ corresponding to the previously-generated base sequence by $e^{j\alpha n}$ (S725).

Also, generating of an SRS sequence in step S725 may be performed by equation (8) below. However, the present invention is not limited to this configuration.

$$r^{SRS}(n) = r_{u,v}^{(\alpha)}(n) = e^{j\alpha n} \bar{r}_{u,v}(n), \text{ and } 0 \leq n \leq M_{sc}^{RS} \quad (8)$$

In equation (8), $M_{sc}^{RS} = m N_{sc}^{RE}$ is the length of an SRS sequence, $1 \leq m \leq N_{RB}^{maxUL}$, u is a sequence group number, and v is a base sequence number within the group. In equation (8), $N_{sc}^{RB}$ is the number of subcarriers per RB, and usually corresponds to 12 subcarriers. Also, $N_{RB}^{maxUL}$ corresponds to the maximum number of RBs which may be allocated during uplink (UL) transmission. Accordingly, $N_{sc}^{RS}$ represents the total number of subcarriers used to transmit a reference signal.

Then, the SRS sequence is mapped into a time-frequency resource domain through a resource element mapper, etc. For example, the SRS sequence is mapped to a last OFDM symbol axis of an SRS transmission subframe determined by the system (S730).

In the case of LTE, the SRS transmission subframe is differently defined for each cell by using both a 4-bit value, which is forward provided by the upper side or by the upper layer, and a previously-defined table value. Also, the SRS transmission subframe is again determined for each of UEs belonging to a cell within the SRS transmission subframe defined for each cell. However, the present invention is not limited to this configuration. Namely, information on an SRS transmission subframe is not limited to the configuration as described above, and thus may be periodically or aperiodically transmitted to the UE through various transmission channels and signalings, in such a manner that the information has one or more information bits.

Based on the SRS value mapped to the last symbol of the SRS transmission subframe, the UE first generates an SCFDMA symbol including the SRS signal through a signal generator, such as an SCFDMA (Single Carrier FDMA) signal generator, and then transmits the SCFDMA symbol including the SRS signal to the BS (S735).

In the method for extending and transmitting a reference signal as described above, the description has been made in such a manner that generating of the base sequence (S700) is performed before receiving of the two CS parameters (S705 and S710). However, the present invention is not limited to this configuration, and thus the order of the steps may be changed.

Figure 8:
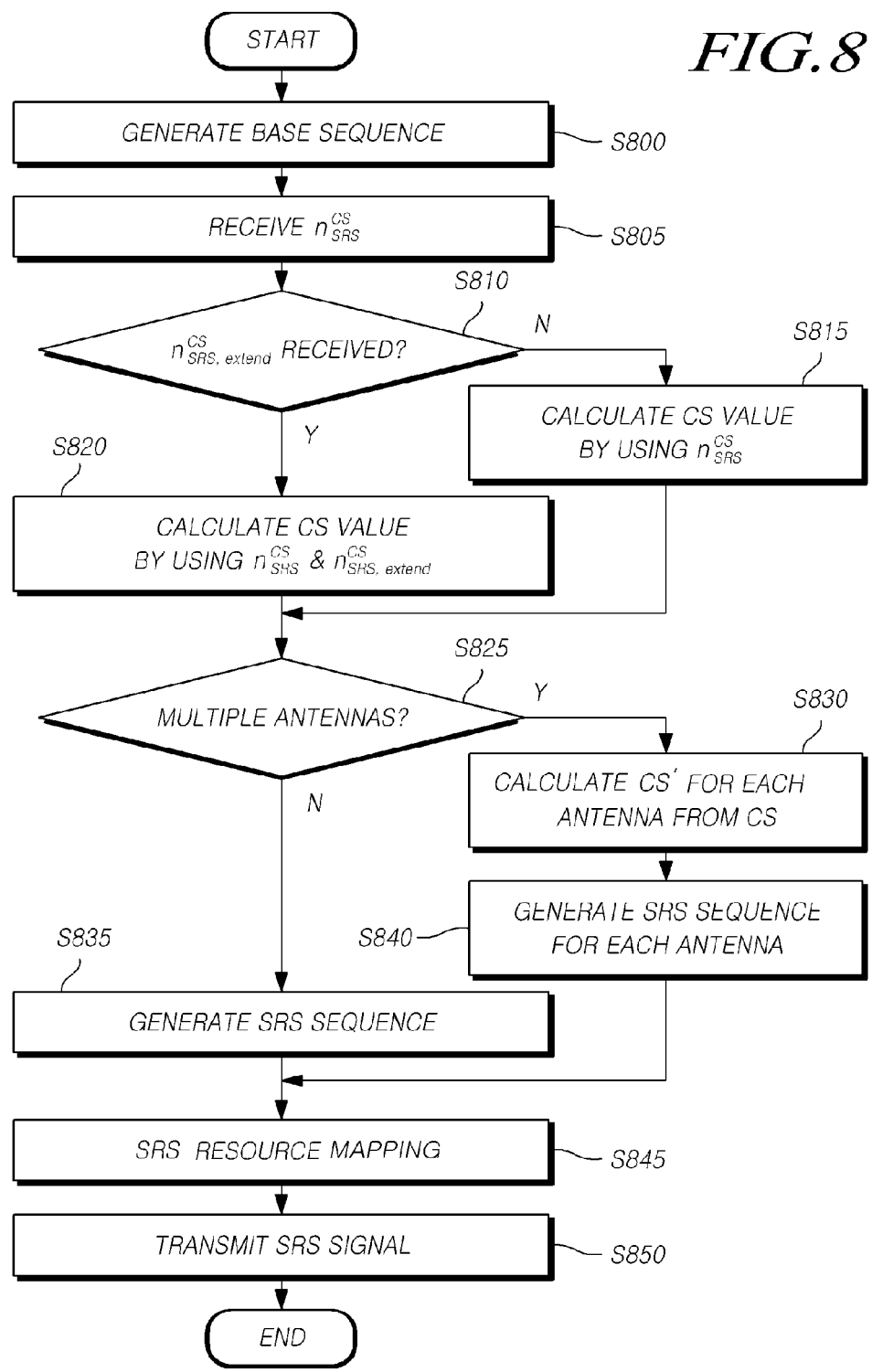
FIG. 8 is a flowchart showing the entire flow of a method for extending and transmitting a reference signal according to another embodiment of the present invention.

FIG. 8 is a flowchart showing the entire flow of a method for extending and transmitting a reference signal according to another embodiment of the present invention.

A difference between another embodiment as shown in FIG. 8 and an embodiment as shown in FIG. 7 is that an embodiment as shown in FIG. 7 corresponds to a case where a UE includes a single antenna, whereas another embodiment as shown in FIG. 8 may be applied to a UE including multiple antennas.

Similarly to the configuration of an embodiment as shown in FIG. 7, a method for transmitting a reference signal according to another embodiment as shown in FIG. 8 includes, generating a base sequence by a UE (S800), receiving $n_{SRS}^{CS}$ corresponding to a basic CS parameter or a cyclic delay value from an upper layer (S805), identifying whether $n_{SRS,extend}^{CS}$ corresponding to an extended CS parameter is received from the upper layer (S810), and calculating an extended CS value by using $n_{SRS}^{CS}$ corresponding to the basic CS parameter and $n_{SRS,extend}^{CS}$ corresponding to the extended CS parameter when the extended CS parameter has been received (S820), which are identical to the corresponding steps in an embodiment as shown in FIG. 7, respectively. Accordingly, in order to avoid repetition of description, a detailed description of the above steps will be omitted.

After an extended CS value is calculated, a determination is made of whether the UE includes multiple antennas (S825). When the UE includes two or more antennas, α' corresponding to an extended CS for each antenna is determined based on as corresponding to the multiple calculated extended CS values (S830). An SRS sequence for each antenna is finally generated by multiplying $\bar{r}_{u,v}(n)$ corresponding to the previously-generated base sequence by $e^{j\alpha n}$ (S840).

It goes without saying that an SRS sequence is finally generated by multiplying $r_{u,v}(n)$ corresponding to the base sequence by $e^{j\alpha n}$ as in step S725 of an embodiment as shown in FIG. 7 when the UE includes a single antenna (S835).

Then, the SRS sequence or an SRS sequence for each antenna is mapped to a last OFDM symbol axis of an SRS transmission subframe determined by the system, through a resource element mapper (S845). The UE first generates an SCFDMA symbol including the SRS signal through an SCFDMA (Single Carrier FDMA) signal generator, and then transmits the SCFDMA symbol including the SRS signal to the BS (S850).

Figure 9:
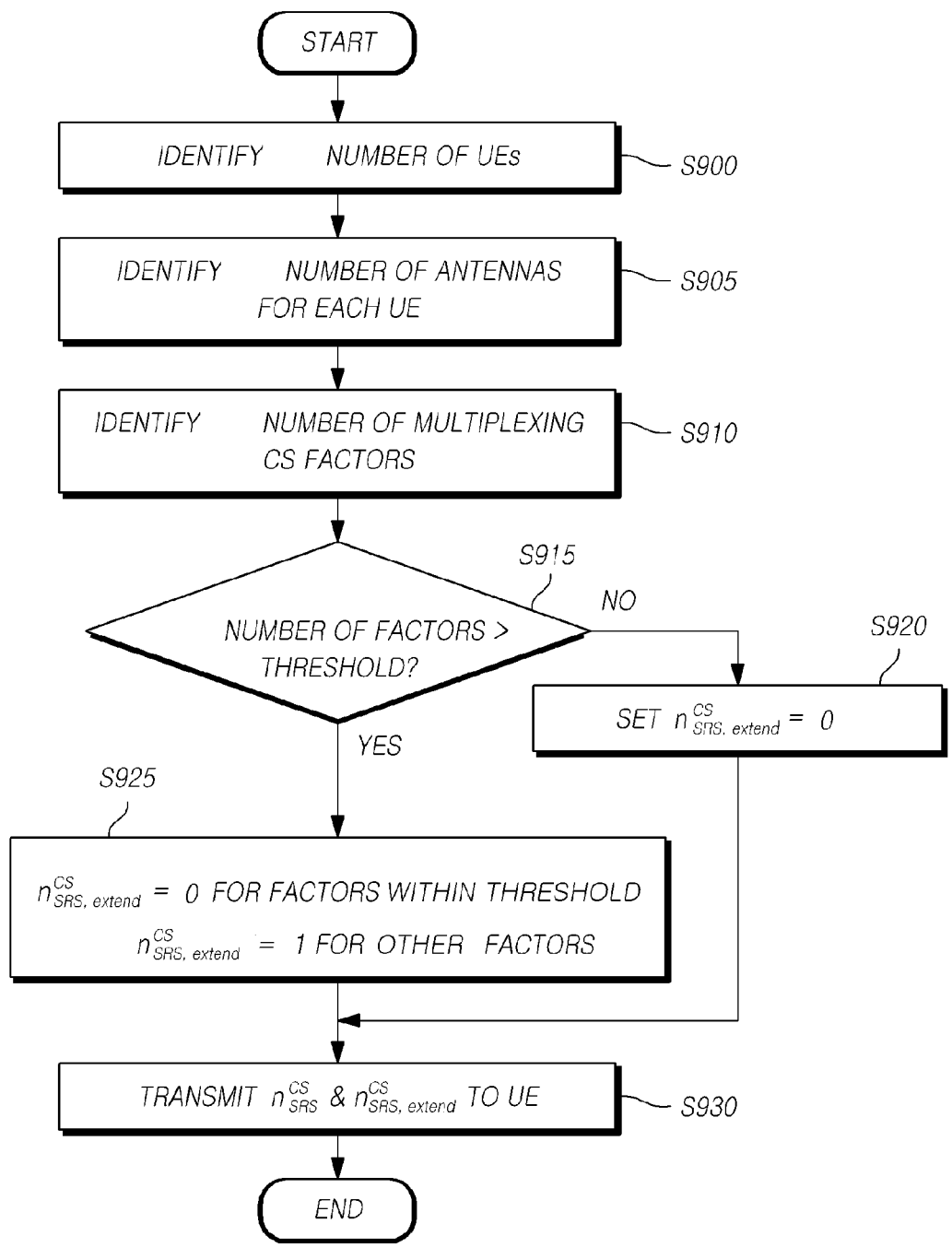
FIG. 9 is a flowchart showing the entire flow of a method for transmitting a CS parameter, which is used to extend and transmit a reference signal according to an exemplary embodiment of the present invention.

FIG. 9 is a flowchart showing the entire flow of a method for transmitting a CS parameter, which is used to extend and transmit a reference signal according to an exemplary embodiment of the present invention.

A method for transmitting a CS parameter according to an embodiment of the present invention, which is a method for transmitting a CS parameter for extending a reference signal generated by using a CS, may include: determining a basic CS parameter $n_{SRS}^{CS}$ and an extended CS parameter $n_{SRS,extend}^{CS}$ based on the number of reference signals requiring support; and transmitting the determined basic CS parameter and the determined extended CS parameter.

An embodiment as shown in FIG. 9 may be performed by a BS apparatus, such as an eNB when a reference signal of the present invention is an SRS. However, the present invention is not limited to this configuration.

A more specific configuration of a method for transmitting a CS parameter according to an embodiment of the present invention will be described below with reference to FIG. 9.

First, a BS apparatus or the like identifies the number of UEs needing to simultaneously transmit an SRS (S900), and identifies the number of antennas included in each UE (S905).

A calculation is made of the number of multiplexing CS factors, which are to be simultaneously transmitted in a state where CS values are caused to differ from each other, based on the recognized number of UEs and the recognized number of antennas for each UE (S910)

Herein, multiplexing CS factors signify communication resources, between which an orthogonal discrimination should be made, and which should be simultaneously multiplexed and should be used to transmit an SRS, for example, UEs, or antennas for each UE. CS values associated with each multiplexing CS factor, namely, degrees of phase shifts of a base sequence should be orthogonal to each other.

Whether the identified number of multiplexing CS factors exceeds a predetermined threshold is identified (S915). When the identified number of multiplexing CS factors exceeds the predetermined threshold, an extended CS parameter $n_{SRS,extend}^{CS}$ is set to "0" for multiplexing CS factors, the number of which is equal to the threshold or is less than the threshold. Also, for remaining multiplexing CS factors, an extended CS parameter $n_{SRS,extend}^{CS}$ is set to 1 (S925).

It goes without saying that the extended CS parameter $n_{SRS,extend}^{CS}$ is set to "0" for all multiplexing CS factors differently from step S925 when a result of the identification in step S915 shows that the number of multiplexing CS factors is less than the predetermined threshold (S920).

Also, although not shown in the drawings, in both steps S915 and S920, a basic CS parameter is separately allocated to each multiplexing CS factor in such a manner that multiplexing CS factors are orthogonal to each other.

Then, the extended CS parameter $n_{SRS,extend}^{CS}$ and the basic CS parameter $n_{SRS}^{CS}$, which have been determined in steps S915 and S920, are transmitted to a relevant UE (S925).

Figure 10:
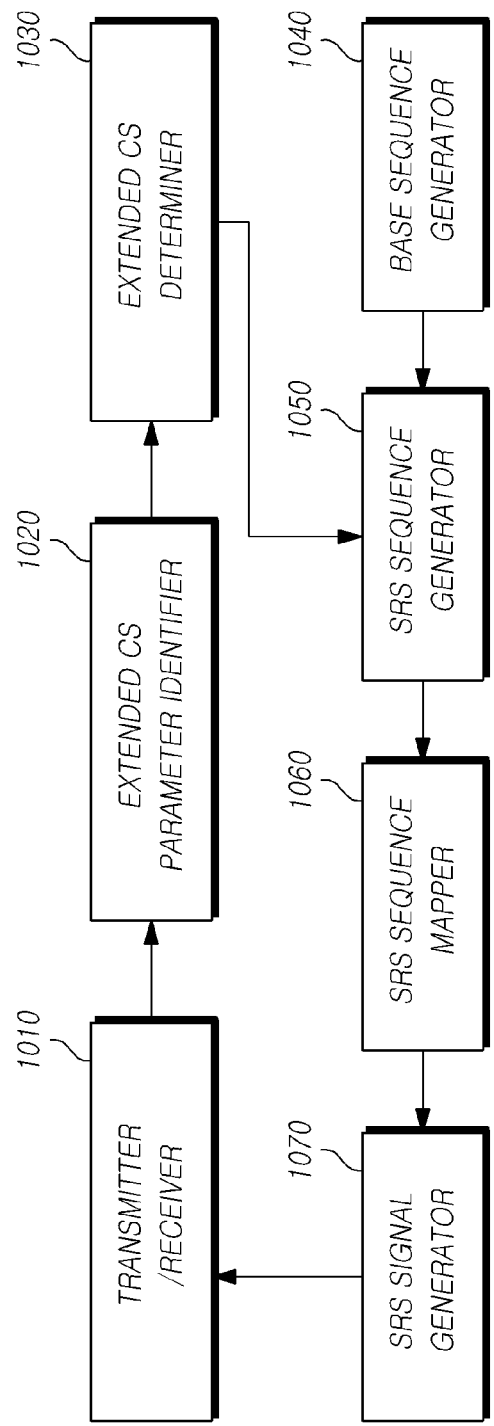
FIG. 10 is a block diagram showing the configuration of an apparatus for transmitting a reference signal, to which a technology for extending a CS and generating an extended CS is applied according to an exemplary embodiment of the present invention.

FIG. 10 is a block diagram showing the configuration of an apparatus for transmitting a reference signal, to which a method for extending a CS is applied according to an exemplary embodiment of the present invention.

An apparatus for extending and transmitting a reference signal according to an exemplary embodiment of the present invention, which is an apparatus for extending and transmitting a reference signal generated by using a CS, may include: a transmitter/receiver for receiving a basic CS parameter $n_{SRS}^{CS}$ and an extended CS parameter $n_{SRS,extend}^{CS}$ and transmitting a generated reference signal; an extended CS determiner for determining an extended CS based on a function of both the received basic CS parameter $n_{SRS}^{CS}$ and the received extended CS parameter $n_{SRS,extend}^{CS}$; and a reference signal generator for generating a reference signal by using the determined extended CS.

An apparatus for generating a reference signal according to an exemplary embodiment of the present invention may correspond to a UE in the case of an uplink reference signal, or may correspond to a BS apparatus in the case of a downlink reference signal. As an example of a reference signal, only an SRS will be described below. However, an exemplary embodiment of the present invention is not limited only to an SRS, and thus should be interpreted as being applied to all types of reference signals generated by using a CS.

More specifically, the apparatus for extending and transmitting a reference signal as shown in FIG. 10 may include a transmitter/receiver 1010, an extended CS parameter identifier 1020, an extended CS determiner 1030, a base sequence generator 1040, an SRS sequence generator 1050, an SRS sequence mapper 1060, and an SRS signal generator 1070. However, the present invention is not limited to this configuration.

The transmitter/receiver 1010 may include a function of receiving an extended CS parameter and a basic CS parameter, which are transmitted by the BS apparatus or the like, and a function of transmitting, to the BS apparatus or the like, an SCFDMA symbol including an SRS signal generated by the SRS signal generator.

The extended CS parameter identifier 1020 may perform a function of first analyzing CS parameters received from the upper layer or the BS apparatus and then identifying whether an extended CS parameter exists, or the value of the extended CS parameter. Also, the extended CS parameter identifier 1020 may additionally include a function of identifying the value of a basic CS parameter.

The extended CS determiner 1030 may perform a function of determining a final extended CS by using the value of the received basic CS parameter and the value of the received extended CS parameter. At this time, one of the schemes as expressed by equations (5) to (7) may be applied to this determination.

The base sequence generator 1040 performs a function of generating a base sequence for an SRS sequence. The base sequence $\bar{r}_{u,v}(n)$ may be generated based on a Zadoff-Chu sequence. However, the present invention is not limited to this configuration. The length of the base sequence is equal to the total number of subcarriers allocated for transmitting an SRS on one symbol axis. Namely, when the length of the base sequence is represented as $M_{sc}^{RS}$, $0 \leq n < M_{sc}^{RS}$.

The SRS sequence generator 1050 uses a corresponding to an extended CS value calculated by an extended CS determiner, and an SRS sequence is finally generated by multiplying the previously-generated base sequence $\bar{r}(n)$ by $e^{j\alpha n}$.

The SRS sequence mapper 1060 may perform a function of mapping the generated SRS sequence to a resource allocation region in the time-frequency domain. For example, the SRS sequence mapper 1060 may map the SRS sequence to a last OFDM symbol axis of an SRS transmission subframe determined by the system. However, the present invention is not limited to this example.

The SRS signal generator 1070 may generate a final SRS signal based on the mapped SRS sequence. For example, the SRS signal generator 1070 may generate an SCFDMA symbol including the SRS signal, based on the SRS value mapped to the last symbol of the SRS transmission subframe.

The SRS signal generated as described above is transmitted to the BS apparatus or the like through the transmitter/receiver 1010.

The SRS sequence mapper 1060 and the SRS signal generator 1070 may be implemented as independent elements. In contrast, as the case may be, the SRS sequence mapper 1060 and the SRS signal generator 1070 may be implemented in such a manner as to be combined with each of a scrambler, a modulation mapper, a transform precoder, a resource element mapper and an SCFDMA signal generator, which are the existing elements of the UE, Particularly, the SRS sequence mapper 1060 may be implemented within the resource element mapper, or may be implemented in association with it. Also, an SRS signal generator 1070 may be implemented within an SCFDMA signal generator, or may be implemented in association with it.

Also, although not shown in the drawings, the apparatus for transmitting a reference signal, which performs an embodiment as shown in FIG. 8, may additionally include an identifier for recognizing and identifying the number of antennas, as well as the elements as shown in FIG. 10. In this case, the extended CS determiner 1030 may determine α' corresponding to an extended CS for each antenna when the number of antennas is plural. The SRS sequence generator 1050 may finally generate an SRS sequence for each antenna, by multiplying $\bar{r}_{u,v}(n)$ corresponding to the previously-generated base sequence by $e^{j\alpha'n}$.

Figure 11:
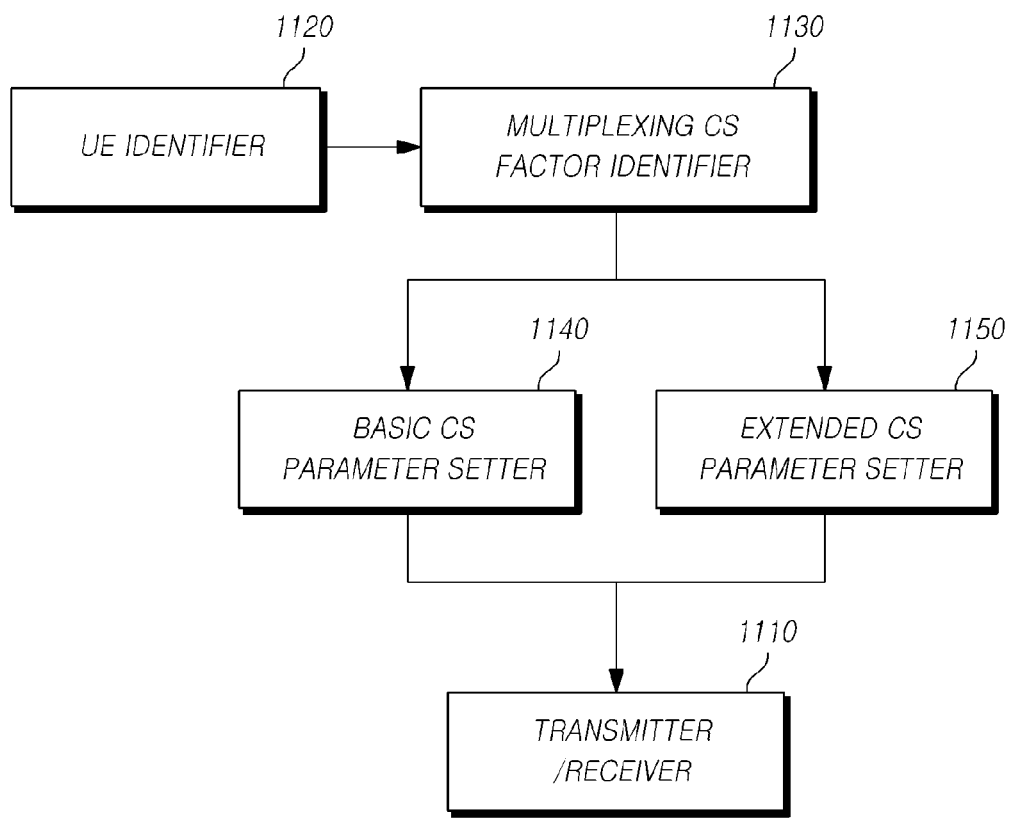
FIG. 11 is a block diagram showing the configuration of an apparatus for transmitting a CS parameter, which is used for a technology for extending a CS and generating an extended CS according to an exemplary embodiment of the present invention.

FIG. 11 is a block diagram showing the configuration of an apparatus for transmitting a CS parameter, which is used for a technology for generating an extended CS according to an exemplary embodiment of the present invention.

An apparatus for transmitting a CS parameter according to an exemplary embodiment of the present invention, which is an apparatus for transmitting a CS parameter for extending a reference signal generated by using a CS, may include: a CS parameter setter for setting a basic CS parameter $n_{SRS}^{CS}$ and an extended CS parameter $n_{SRS,extend}^{CS}$ based on the number of reference signals requiring support; and a transmitter for transmitting the set basic CS parameter and the set extended CS parameter.

The apparatus for transmitting a CS parameter according to an exemplary embodiment of the present invention may correspond to a BS apparatus in the case of an uplink reference signal, or may correspond to a UE in the case of a downlink reference signal. As an example of a reference signal, only an SRS will be described below. However, an exemplary embodiment of the present invention is not limited only to an SRS, and thus should be interpreted as being applied to all types of reference signals generated by using a CS.

Referring to FIG. 11, more specifically, the apparatus for transmitting a CS parameter may include a transmitter/receiver 1110, a UE identifier 1120, a multiplexing CS factor identifier 1130, a basic CS parameter setter 1140, and an extended CS parameter setter 1150.

The UE identifier 1120 performs a function of identifying the number of UEs needing to simultaneously transmit an SRS and the number of antennas included in each UE.

The multiplexing CS factor identifier 1130 performs: a function of calculating the number of multiplexing CS factors, which are to be simultaneously transmitted in a state where CS values are caused to differ from each other, based on the recognized number of UEs and the recognized number of antennas for each UE; a function of identifying whether the identified number of multiplexing CS factors exceeds a predetermined threshold; and a function of causing the extended the CS parameter setter 1150 to set an extended CS parameter $n_{SRS,extend}^{CS}$ to "0" for multiplexing CS factors, the number of which is equal to the threshold or is less than the threshold when the identified number of multiplexing CS factors exceeds the threshold, and causing the extended the CS parameter setter 1150 to set the extended CS parameter $n_{SRS,extend}^{CS}$ to 1 for remaining multiplexing CS factors.

Herein, multiplexing CS factors signify communication resources, between which an orthogonal discrimination should be made, and which should be simultaneously multiplexed and should be used to transmit an SRS, for example, UEs, or antennas for each UE. CS values associated with each multiplexing CS factor, namely, degrees of phase shifts of a base sequence should be orthogonal to each other.

The basic CS parameter setter 1140 and the extended CS parameter setter 1150 perform a function of determining a basic CS parameter and an extended CS parameter in such a manner as to generate CSs orthogonal to each other, based on the number of UEs, the number of antennas for each UE, and the threshold. In this case, the basic CS parameter may be $n_{SRS}^{CS} \in \{0, \ldots, 7\}$ corresponding to a basic CS parameter according to LTE, and the extended CS parameter may be $n_{SRS,extend}^{CS} \in \{0, \ldots 1\}$ corresponding to an extended CS parameter which is newly defined for LTE-A. However, the present invention is not limited to this configuration.

The basic CS parameter $n_{SRS}^{CS}$ and the extended CS parameter $n_{SRS,extend}^{CS}$, which have been set by the basic CS parameter setter 1140 and the extended CS parameter setter 1150, are transmitted to a relevant UE through the transmitter/receiver 1110.

At this time, the basic CS parameter $n_{SRS}^{CS}$ is a 3-bit value which is determined by the upper side of the system as in the existing LTE, and may have a total of 8 values, such as 0 to 7, each of which is a value obtained by expressing this 3-bit value in a decimal form. When there is a need for an additional extended CS value other than 8 CS values according to the existing LTE Rel-8, the extended CS parameter $n_{SRS,extend}^{CS}$ has a value of 1. Otherwise, the extended CS parameter $n_{SRS,extend}^{CS}$ has a value of "0." However, the present invention is not limited to this configuration.

Also, the basic CS parameter and the extended CS parameter may be transmitted through signaling of a physical layer (L1) such as a PDCCH, or signaling of a Media Access Control layer (MAC) layer of the second layer (L2), or L3 signaling such as a Radio Resource Control (RRC) signaling or message. However, the present invention is not limited to this configuration.

The exemplary embodiments of the present invention as described above provide a technology for increasing the number of CS values (αs) of an SRS from the existing 8 to 12 or 16 by adding 4 or 8 to the existing 8, in order to increase the number of orthogonal resources, between which an orthogonal discrimination should first be made and which should then be multiplexed, in view of each UE (i.e. terminal) or each BS (i.e. cell) in an environment, which includes an increase in the number of antennas in LTE-A, a new MU MIMO and CoMP, in the case of transmitting a reference signal such as an uplink SRS. Accordingly, it is possible to perform signaling for a basic CS parameter in the existing LTE together with signaling for a newly-added extended CS parameter, for backward compatibility with the existing LTE, while maintaining the backward compatibility. Further, the UE can generate 12 to 16 CSs by using the basic CS parameter and the extended CS parameter.

Also, there is an advantage in that it is possible to ensure orthogonality between extended CSs and two SRS sequences having different CS values and reduce interference between the two SRS sequences having different CS values, by causing a phase difference between the extended CSs to become as large as possible.

Although it has been described in the above that all the components of an embodiment of the present invention are coupled as a single unit or coupled to be operated as a single unit, the present invention is not necessarily limited to such an embodiment. Namely, within the purpose of the present invention, one or more components among the components may be selectively coupled to be operated as one or more units. Also, although each of the components may be implemented as an independent hardware, some or all of the components may be selectively combined with each other, so that they may be implemented as a computer program having one or more program modules for performing some or all of the functions combined in one or more hardwares. Codes and code segments forming the computer program can be easily conceived by an ordinarily skilled person in the technical field of the present invention. Such a computer program may implement the embodiments of the present invention by being stored in a computer-readable medium, and being read and executed by the computer. Storage mediums for storing the computer program may include a magnetic recording medium, an optical recording medium, a carrier wave medium, etc.

In addition, since terms, such as "including," "comprising," and "having" mean that one or more corresponding components may exist unless they are specifically described to the contrary, it shall be construed that one or more other components can be further included. All of the terminologies including one or more technical or scientific terminologies have the same meanings that those having ordinary knowledge in the technical field of the present invention understand ordinarily unless they are defined otherwise. A term ordinarily used like that defined by a dictionary shall be construed that it has a meaning equal to that in the context of a related description, and shall not be construed in an ideal or excessively formal meaning unless it is clearly defined in the present specification.

Although the above description is only an illustrative description of the technical idea of the present invention, those having ordinary knowledge in the technical field of the present invention will appreciate that various modifications, additions and substitutions are possible, without departing from the scope and spirit of the invention as disclosed in the appended claims. Therefore, the embodiments disclosed in the present invention are intended to illustrate the scope of the technical idea of the present invention, and the scope of the technical idea of the present invention is not limited by the embodiments. The protection scope of the present invention should be construed based on the accompanying claims, and all of the technical ideas included within the scope equivalent to the claims should be construed as being included within the right scope of the present invention.

The invention claimed is:

1. A method for extending and transmitting a reference signal generated by using a cyclic shift (CS), the method comprising:
   receiving a basic CS parameter and an extended CS parameter;
   determining an extended CS based on a function of the received basic CS parameter and the received extended CS parameter;
   generating a reference signal by using the determined extended CS; and
   transmitting the generated reference signal,
   wherein the reference signal corresponds to a sounding reference signal (SRS), and the extended CS is determined by $$\alpha(n_{SRS}^{CS}, n_{SRS,extend}^{CS}) = 2\pi \frac{(n_{SRS}^{CS} + n_{SRS,extend}^{CS}/2)}{8},$$

and $$n_{SRS,extend}^{CS} \in \{0, 1\},$$

$$\alpha(n_{SRS}^{CS}, n_{SRS,extend}^{CS}) = 2\pi \frac{(n_{SRS}^{CS} \cdot (n_{SRS,extend}^{CS} + 1) + n_{SRS,extend}^{CS}/2)}{8},$$

and $$n_{SRS,extend}^{CS} \in \{0, 1\}, \text{ or}$$

$$\alpha(n_{SRS}^{CS}, n_{SRS,extend}^{CS}) = 2\pi \frac{(n_{SRS}^{CS} \cdot (n_{SRS,extend}^{CS} + 1) + 3n_{SRS,extend}^{CS}/2)}{8},$$

and $$n_{SRS,extend}^{CS} \in \{0, 1\},$$

when the basic CS parameter is $n_{SRS}^{CS}$, the extended CS parameter is $n_{SRS,extend}^{CS}$, and the extended CS is $\alpha(n_{SRS}^{CS}, n_{SRS,extend}^{CS})$.

2. The method as claimed in claim 1, wherein the basic CS parameter comprises 3 bits, and the extended CS parameter comprises a 1-bit signal representing 0 or 1.

3. The method as claimed in claim 1, wherein generating the SRS comprises:
   generating an SRS sequence by multiplying $\bar{r}_{u,v}(n)$ corresponding to a previously-generated base sequence by $e^{j\alpha n}$, when α corresponding to the extended CS is calculated;
   mapping the SRS sequence into a time-frequency resource domain; and
   generating a signal including the mapped SRS by using a signal generator.

4. A method for transmitting a cyclic shift (CS) parameter for extending a reference signal generated by using a CS, the method comprising:
   determining a basic CS parameter and an extended CS parameter based on the number of reference signals requiring support; and
   transmitting the determined basic CS parameter and the determined extended CS parameter,
   wherein the number of the reference signals requiring the support corresponds to the number of multiplexing CS factors which are to be simultaneously transmitted in a state where CS values are caused to differ from each other.

5. The method as claimed in claim 4, wherein whether the number of the multiplexing CS factors exceeds a predetermined threshold is identified, and when the identified number of the multiplexing CS factors exceeds the predetermined threshold, a value of the extended CS parameter is set as "0" for multiplexing CS factors, the number of which is equal to the predetermined threshold or is less than the predetermined threshold, and a value of the extended CS parameter is set as 1 for remaining multiplexing CS factors.

6. The method as claimed in claim 4, wherein the basic CS parameter corresponds to one of integer values from 0 to 7, which are represented by 3 bits, and the extended CS parameter corresponds to either 0 or 1, which is represented by 1 bit.

7. An apparatus for extending and transmitting a reference signal generated by using a cyclic shift (CS), the apparatus comprising:
    a transmitter/receiver for receiving a basic CS parameter and an extended CS parameter, and transmitting a generated reference signal;
    an extended CS determiner for determining an extended CS based on the received basic CS parameter and the received extended CS parameter; and
    a reference signal generator for generating a reference signal by using the determined extended CS,
    wherein the reference signal corresponds to a sounding reference signal (SRS), and the extended CS is determined by $$\alpha(n_{SRS}^{CS}, n_{SRS,extend}^{CS}) = 2\pi \frac{(n_{SRS}^{CS} + n_{SRS,extend}^{CS}/2)}{8},$$

and $$n_{SRS,extend}^{CS} \in \{0, 1\},$$

$$\alpha(n_{SRS}^{CS}, n_{SRS,extend}^{CS}) = 2\pi \frac{(n_{SRS}^{CS} \cdot (n_{SRS,extend}^{CS} + 1) + n_{SRS,extend}^{CS}/2)}{8},$$

and $$n_{SRS,extend}^{CS} \in \{0, 1\}, \text{ or}$$

$$\alpha(n_{SRS}^{CS}, n_{SRS,extend}^{CS}) = 2\pi \frac{(n_{SRS}^{CS} \cdot (n_{SRS,extend}^{CS} + 1) + 3n_{SRS,extend}^{CS}/2)}{8},$$

and $$n_{SRS,extend}^{CS} \in \{0, 1\},$$

when the basic CS parameter is $n_{SRS}^{CS}$, the extended CS parameter is $n_{SRS,extend}^{CS}$, and the extended CS is $\alpha(m_{SRS}^{CS}, n_{SRS,extend}^{CS})$.

8. An apparatus for transmitting a cyclic shift (CS) parameter for extending a reference signal generated by using a CS, the apparatus comprising:
    a CS parameter setter for setting a basic CS parameter and an extended CS parameter based on the number of reference signals requiring support; and
    a transmitter for transmitting the set basic CS parameter and the set extended CS parameter,
    wherein the number of the reference signals requiring the support corresponds to the number of multiplexing CS factors which are to be simultaneously transmitted in a state where CS values are caused to differ from each other.

9. A method for extending and transmitting a reference signal generated by using a cyclic shift (CS), the method comprising:
    receiving a basic CS parameter and an extended CS parameter;
    determining an extended CS based on a function of the received basic CS parameter and the received extended CS parameter;
    generating a reference signal by using the determined extended CS; and
    transmitting, by a wireless transceiver, the generated reference signal,
    wherein the reference signal corresponds to a sounding reference signal (SRS), and wherein generating the SRS comprises:
        generating an SRS sequence by multiplying $\bar{r}_{u,v}(n)$ corresponding to a base sequence by $e^{j\alpha n}$, when $\alpha$ corresponding to the extended CS is calculated;
        mapping the SRS sequence into a time-frequency resource domain; and generating a signal including the mapped SRS by using a signal generator.

* * * * *